A. J. SIGNOR

DISPENSING MACHINE

May 3, 1932. Re. 18,449

Original Filed July 17, 1924 2 Sheets-Sheet 1

Inventor
A. J. Signor
By
Attorney

A. J. SIGNOR

DISPENSING MACHINE

May 3, 1932. Re. 18,449

Original Filed July 17, 1924 2 Sheets-Sheet 2

Inventor
A. J. Signor

By A. J. Patterson

Attorney

Reissued May 3, 1932 Re. 18,449

UNITED STATES PATENT OFFICE

ALFRED J. SIGNOR, OF ELKHART, INDIANA, ASSIGNOR TO FRANK E. LIVERANCE, JR., OF GRAND RAPIDS, MICHIGAN

DISPENSING MACHINE

Original No. 1,602,314, dated October 5, 1926, Serial No. 726,530, filed July 17, 1924. Application for reissue filed September 27, 1928. Serial No. 308,837.

This invention relates to improvements in a dispensing machine pertaining more particularly to a wheeled dispenser for dispensing or distributing cement or the like between or on the edges of roofing paper.

In the embodiment of the machine shown it is described as dispensing or distributing cement on the edges of roofing paper so that the edges of the sheets will have a waterproofed joint. It will be understood however that the machine or device shown can be readily utilized for distributing or dispensing any kind of liquid and can be used for other purposes than the specific specified use in connection with roofing paper.

One of the objects of the invention is to provide a novel construction of movable container adapted to discharge or spread liquid.

Another object of the invention is to provide a cement discharge or spreading device having a novel form of discharge spout and provided with a novel means for guiding the device to spread and distribute the cement in the desired places.

A still further object of the invention is to provide a wheeled discharging or spreading device for cement or the like which is provided with means for distributing the cement, means for guiding the direction of movement of the device and means for forcing the cement from the device and controlling the amount of discharge through the distributing medium.

A still further object of the invention is to provide a wheeled force feed dispensing or distributing device for cement which is particularly adapted for use in cementing the overlapping edges of roofing paper or the like.

Another and further object of the invention is to provide a device of the character described which is cheap and simple of manufacture and highly efficient in operation.

Other further objects, novel features of construction and improved results of the invention will appear in the following description and accompanying drawings.

Figure 1:
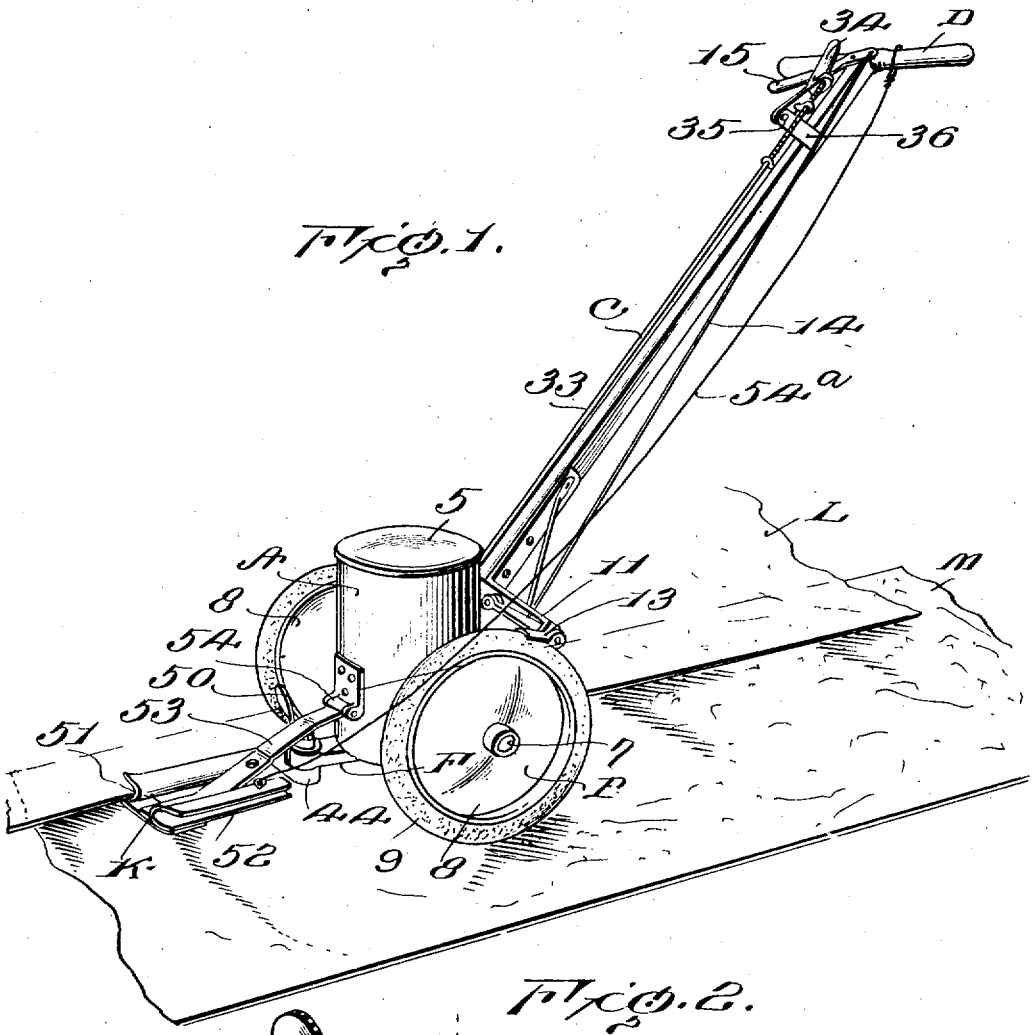
Figure 1 is a perspective view of the machine.
Figure 2:
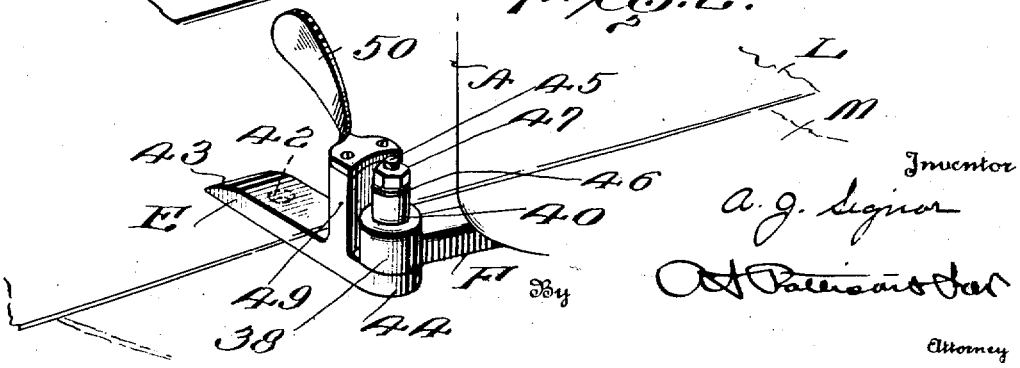
Fig. 2 is a detailed perspective view showing the dispensing or distributing foot or nozzle.

Referring now to the drawings in which like parts are designated by similar reference numerals, A represents a tank or container, B a running gear or supporting wheels for the container, C the handle shaft and D the handle for pushing the container. E represents the spreading or distributing foot or spout, F the liquid conduit, G the outlet valve and H the liquid pump. The machine guide is represented by K while L and M represent two sheets of roofing paper or the like.

Describing the invention more specifically it will be seen that the container or tank A is preferably cylindrical in shape having an open top 5 while its bottom is closed by a plate 6. The container or tank is supported through the medium of a horizontal shaft or axel 7 provided at its ends at either side of the tank with wheels 8 which may if desired be provided with rubber tires 9. The shaft 7 is supported in journals or bearings 10 at either side of the container or tank A as clearly appears in Fig. 4 of the drawings.

Motion is imparted to the supported tank A through the handle shaft C provided at its upper end with the transverse handle D. The lower end of the handle shaft C is provided with brackets 11 which extend downwardly between the tank and the wheels 8 and are supported as at 12 upon the shaft 7 of the machine.

To provide a means for stopping and locking the machine against movement there are provided brakes 13 which engage the wheels of the machine. The brake is actuated through the medium of a rod 14 which extends upwardly to the cross handle D where it is connected to a pivoted operating handle 15.

A housing 16 cast integrally with the bottom 6 of the tank and extending upwardly into the same carries the meshing pump gears 17 and 18 which are provided at their under sides with studs 19 which are rotatably supported in suitable depressions 20 in the tank bottom 6. Adjacent the depressions 20 and surrounding them are larger depressions 21 in which the gears 17 and 18 rotate. The pump gear 18 is provided with an upwardly extending shaft 22 upon the upper end of which is suitably fastened a beveled gear 23 which engages the gear 24 carried upon the shaft 7 of the machine.

The housing 16 is closed at its top by a plate 25 which is provided with a bearing 26 for the vertical shaft 22 of the beveled gear 23. This plate is provided with an extension 27 which overhangs the rear end of the housing 16 which is open as at 28 to the tank.

Figure 3:
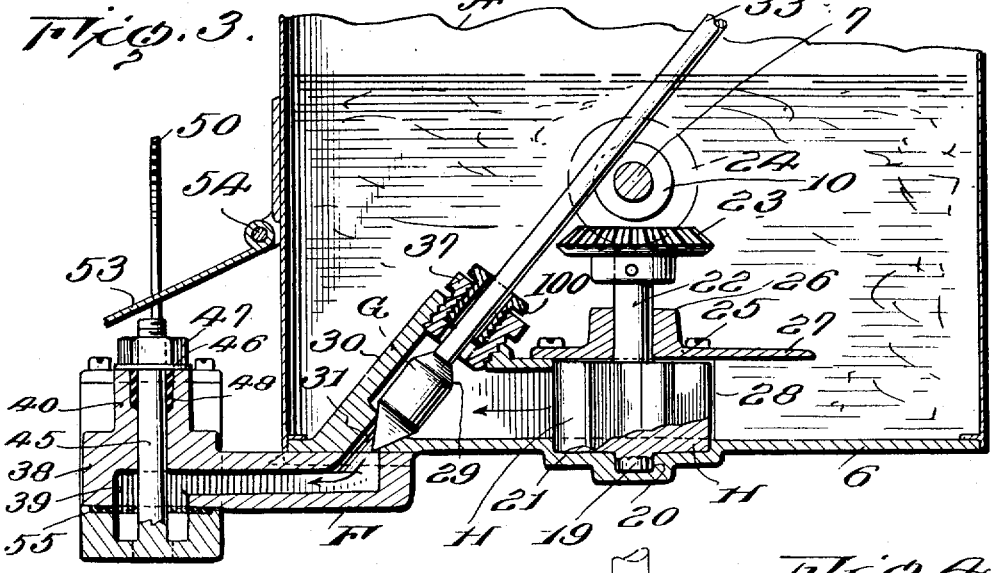
Fig. 3 is a vertical sectional view through the liquid pump and the delivery conduit and conduit valve.

At its front end the housing 16 has communication as at 29 with the valve G which is contained in a cylindrical housing 30 which is cast integrally with the bottom 6 of the tank and in fact forms a part of the pump housing 16. The lower end of the valve housing 30 is provided with a discharge opening 31 which gives communication with the conduit F which is fastened to the bottom 6 of the tank by means of screws 32 or the like. The valve G comprises a shaft 33 having an enlarged head the lower end of which is conical and projects into the discharge opening 31. In Fig. 3 of the drawings the conical end of the valve G is closing the outlet opening 31. As clearly appears in Fig. 1 of the drawings the shaft 33 of the valve G extends upwardly from the tank and has connection with an operating handle 34 which is pivotally mounted as at 35 to an upstanding ear 36 which is fastened to the handle shaft C at a point to make the operating handle 34 convenient to the operator of the machine whereby the valve can be opened and closed at will.

The upper end of the valve housing 30 is provided with a hollow plug 37, in the upper end of which is screw-threadedly mounted a second hollow plug 100. The valve stem 33 extends through these openings. It will be seen that when the valve is in position as shown in Fig. 3, the liquid which is pumped will bypass above the valve around the stem 33 and through the plugs 37 and 100, back into the tank.

Figure 4:
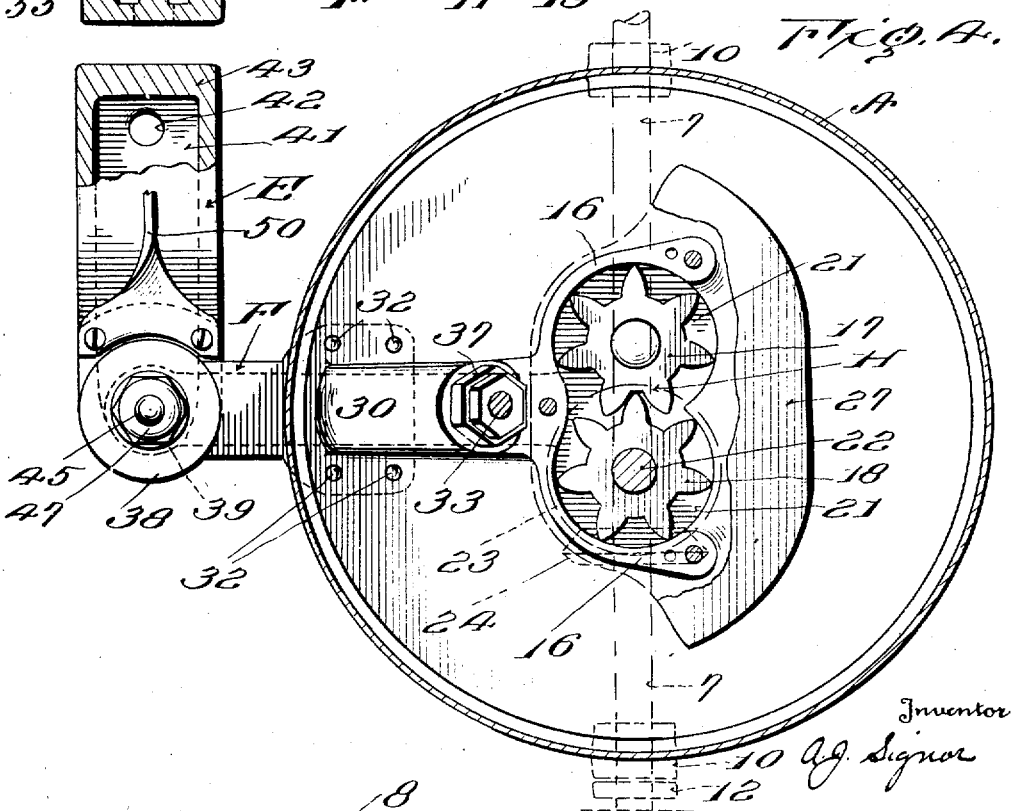
Fig. 4 is a horizontal sectional view through the lower end of the tank or container, the cover over the pump being broken away to show the pump gear arrangement.

Referring now to Figures 3 and 4 of the drawings it will be seen that the conduit F extends outwardly to a position in front of the lower end of the tank or container A terminating in a cylindrical housing 38 the bottom of which is open as at 39 while its top is provided with an upwardly extending hollow open ended bearing 40. The foot or distributing spout E is rectangular in shape being hollow to form a conduit or chamber 41 in the bottom of which is the discharge opening 42 adjacent the outer tapered end 43 of the foot. The inner end 44 of the foot or spout is in communication with the open bottom 39 of the outer end of the conduit F being pivotally supported on the under face of the cylindrical end 38 of the conduit through the medium of the vertical shaft or bolt 45 which extends upwardly thru the cylindrical end of the conduit and its bearing 40, being provided at its end above the bearing with a washer 46 and nut 47. The upper end of the bearing 40 is reamed to receive a packing 48 below the shaft washer 46 and nut 47.

Extending upwardly from the upper face of the foot or spout E and adjacent its inner end 44 there is a crescent shaped shoulder or abutment 49 upon the upper end of which is suitably fastened a handle 50 through the medium of which the foot or spout can be rotated upon its pivot to assume any desired position.

The machine guide K comprises sheet metal bent to form elongated U-shaped channels or grooves 51 and 52, the U of the channel 51 being open in the opposite direction of the U 52 so that the guide will operate even though the roofing sheet M is positioned to overlap the sheet L which would be the reversed position of the sheets as they are shown in Figure 1 of the drawings. The guide K is supported upon a bracket 53 which is pivotally supported as at 54 upon the tank or container A and extends outwardly from its pivotal supporting connection.

It is found it is sometimes necessary to lift the guide K so that the machine can be run close to a wall or chimney and to take care of this contingency a wire 54*a* has its one end connected to the guide and its other end connected to the handle D of the machine where it can be conveniently reached by the operator of the machine.

To insure a tight connection between the distributing foot or spout E and the conduit F a packing 55 is carried between their pivotal connection.

*Operation*

The operation of the machine is simple. The tank or container A is filled with cement or its equivalent and the machine positioned in respect to the roofing sheets L and M, as shown in Figure 1. It is desired to cement the overlapping edges of the sheets L and M together. It will be seen that the edge of the sheet L extends into the elongated horizontal groove 51 of the guide K. The distributing spout or foot E is extending approximately at right angle to the conduit F so that its tapered end 43 is under the edge of the roofing sheet L between this sheet and the sheet M.

It remains now only for the operator to release the brake 13 from engagement with the wheels 8 by means of the handle 15 and to open the valve G through the medium of the valve operating handle 34. The operator now pushes the machine lengthwise of the roofing sheets the machine being guided by the engagement of the guide K with the roofing sheet L.

As the machine is pushed forward the wheels rotate thus imparting rotation to the shaft 7 upon which they are fastened. The shaft 7 in turn rotates the shaft gear 24 which through its engagement with the beveled gear 23 rotates the pump gear 17 which in turn rotates the pump gear 18. The cement in the tank A is also in the pump housing 16 around the pump gears having entered through the open rear end 28 of the pump housing. As the pump gears rotate cement is forced forwardly by the rotation of the gears passing around the enlarged head 34 of the valve G and downwardly through the outlet opening 31, following the conduit F and eventually finding its way through the chamber 41 of the discharge spout or foot E and out the spout opening 42.

As the discharge above takes place the machine is moving forward across the sheets and a line of cement is distributed or discharged between the overlapping edges of the roofing sheets L and M.

To complete the work it remains only to press the overlapping edges of the roofing sheets tightly together.

It will be readily understood that the amount of cement discharged through the spout or foot opening 42 can be controlled by the valve G. Attention is further directed to the fact that the machine is easily guided through the medium of the guide K and that where it is necessary to distribute cement close to a wall or chimney the guide K can be lifted in the manner heretofore described.

From the foregoing it will be seen that I have provided a cement distributing or spreading machine which is simple of construction, highly efficient in operation and which can be manufactured and sold at a reasonable price.

Having thus described my invention, what I claim and desire to secure by Letters Patent is:

1. A dispensing and distributing machine or the like, comprising a container supported upon a wheeled carrier, a gear pump for discharging the contents of the container, said pump located wholly within the bottom of said container and having communication with the container and with an outlet in the container bottom, and said pump having operative engagement with the wheels of the carrier, whereby the movement of the carrier drives the pump.

2. A dispensing and distributing machine for distributing cement between the overlapping edges of roofing paper or the like, comprising a cement container supported upon a movable carrier, a distributing member in communication with the container and adjustable in respect thereto, means for guiding the movement of the carrier, and said guiding means operating through engagement with the overlapping edge of one of the sheets of roofing material.

3. A dispensing and distributing machine for distributing cement between the overlapping edges of roofing paper or the like, comprising a cement container supported upon a wheeled carrier, a distributing member in communication with the container and adjustable in respect thereto, means to force the cement through the distributing member, means for guiding the carrier and said guiding means operating through engagement with the overlapping edge of one of the sheets of roofing material.

4. A dispensing and distributing machine for distributing cement between the overlapping edges of sheet roofing paper or the like, comprising a cement container supported upon a wheeled carrier, a dispensing outlet for said container pivotally supporting a distributing member, a pump for forcing the cement through the container discharge and distributing member, a guide for the carrier operating through engagement with the overlapping edge of one of the sheets of roofing material, and means for imparting movement to the carrier, whereby the distributing member dispenses cement between the sheets of roofing material.

5. A cement dispensing and distributing machine for distributing cement between the overlapping edges of roofing paper or the like, comprising a cement container supported upon a movable carrier, a distributing member in communication with the container and extending in front thereof to a position just above the roofing paper, said distributing member pivotally mounted, whereby it can be positioned to distribute cement between the sheets of roofing paper at either the right or left side of the container, means for guiding the carrier, and said guiding means operating through engagement with the overlapping edge of one of the sheets of roofing material.

6. A dispensing and distributing machine for distributing cement between the overlapping edges of roofing paper or the like, comprising a cement container supported upon a wheeled carrier, a discharge conduit for the container having a distributing member pivotally supported thereon, a guide for the carrier operating through engagement with the overlapping edge of one of the sheets of roofing material, a pump for forcing the contents of the container through the discharge outlet and distributing member, means for controlling the flow of cement through the discharge outlet, and means for imparting movement to the container, whereby cement is distributed between the overlapping edges of the roofing material in a line parallel to the edges of the material.

7. A machine for distributing and dispensing cement or the like betwen the overlapping edges of roofing paper, comprising a cement container supported by a movable carrier adapted to be moved over the paper, a distributing member in communication with the container and extending therefrom to a position just above the paper, said distributing member adjustable in respect to the container whereby it can be positioned to distribute cement between the overlapping edges of the roofing paper at either the right or left side of the container, a guide for the carrier, said guide extending in front of the container and having means for engaging the overlapping edge of one of the sheets of the roofing material at either the right or left side of the container.

8. In an apparatus of the class described, a vehicle, a cement container mounted thereon, a distributing member in communication with the container and adjustably mounted in respect thereto whereby it will extend between the overlapping edges of sheets of roofing material or the like, a guide for the vehicle operating through engagement with the overlapping edge of one of the sheets of roofing material, said guide adapted to engage the roofing material at the right or left of the vehicle as desired, and means for imparting movement to the vehicle and its component parts.

9. A cement distributing and dispensing machine or the like, for distributing cement between the overlapping edges of roofing paper, comprising a cement container supported upon a movable carrier, a distributing member in communication with the container and adjustable in respect thereto whereby it can be positioned to distribute cement between the overlapping edges of the roofing paper at either the right or left side of the container, a guiding means for the carrier, said guiding means extending in front of the carrier comprising a member having U-shaped channels in its opposite sides, whereby the said channels through engagement with the overlapping edge of one of the sheets of the roofing material at their right or left side of the container operates to guide the carrier.

10. A movably mounted dispensing and distributing machine or the like for dispensing its contents between over-lapping sheets of material, a guide for said machine, and said guide comprising a member extending in front of said machine and having at its edges channels adapted to engage the edge of one of the sheets of material.

11. A movably mounted dispensing and distributing machine or the like for dispensing its contents between over-lapping sheets of material, a guide for said machine, and said guide comprising a member supported upon and extending in front of said machine and having at its opposite longitudinal edges channels adapted to engage at either the right or left side of the machine the edge of one of the sheets of material.

12. A movably mounted dispensing and distributing machine or the like for dispensing its contents between over-lapping sheets of material, a guide for said machine, and said guide comprising a member having channels adapted to engage the edge of one of the sheets of material as the machine is progressed in respect to the sheets.

13. A portable dispensing and distributing device for applying liquid material to a surface comprising a wheeled carrier having tractive engagement with the surface for movement in an unrestricted path thereover, a container for the liquid material on the carrier, a nozzle communicating with the container, extending into proximity to the surface and having an opening constricted to deliver the material in a line upon the surface as it is moved along the same, a pump located between the container and the nozzle opening, means including a wheel of the carrier for operating said pump at a rate proportional to the rate of travel of the device along the work to assure uniform application of fluid thereto, and means whereby the carrier may be propelled and guided by hand over the surface.

14. A portable dispensing and distributing device for applying liquid material to a surface comprising a wheeled carrier having tractive engagement with the surface for movement in an unrestricted path thereover, a container for the liquid material on the carrier, a nozzle communicating with the container, extending into proximity to the surface and having an opening constricted to deliver the material in a line or stripe upon the surface as it is moved along the same, a pump located between the container and the nozzle opening, means including a wheel of the carrier for operating said pump at a rate proportional to the rate of travel of the device along the work to assure uniform application of fluid thereto, and means whereby the carrier may be propelled and guided by hand over the surface, said container being arranged above the pump so as to normally feed fluid thereto by gravity, thereby rendering the pump self-priming and insuring a uinform line or stripe.

15. A portable dispensing and distributing device for applying liquid material to a surface comprising a wheel having tractive engagement with the surface for movement in an unrestricted path thereover, a container for the liquid material supported by the wheel, a nozzle out of alignment with said wheel communicating with the container, extending into proximity to the surface and having an opening constricted to deliver the material in a line upon the surface as it is moved along the same, a pump located between the container and the nozzle opening, and operated by the wheel at a rate proportional to the rate of travel of the device along the work to assure uniform application of fluid thereto, and means whereby the container may be propelled and guided by hand over the surface.

16. A portable dispensing and distributing device for applying liquid material to a surface comprising a wheel having tractive engagement with the surface for movement in an unrestricted path thereover, a container for the liquid material supported by the wheel, a nozzle communicating with the container, extending into proximity to the surface and having an opening constricted to deliver the material in a line upon the surface as it is moved along the same, a pump located between the container and the nozzle opening, said wheel being out of alignment with the nozzle and adapted to be operated by engagement with the work as the device is moved along the work, a shaft on which said wheel is carried, a gear on the shaft adapted to operate the pump, said wheel, shaft and gear constituting means for operating said pump at a rate proportional to the rate of travel of the device along the work to assure uniform application of fluid thereto and means whereby the container may be propelled and guided by hand over the surface.

17. A portable dispensing and distributing device for applying liquid material to a surface comprising a pair of coaxial wheels having tractive engagement with the surface for movement in an unrestricted path thereover, a container for the liquid material supported by the wheels, a nozzle communicating with the container, extending into proximity to the surface and having an opening constricted to deliver the material in a line upon the surface as it is moved along the same, a pump located between the container and the nozzle opening, means including at least one of the wheels for operating said pump at a rate proportional to the rate of travel of the device along the work to assure uniform application of fluid thereto and means whereby the container may be propelled and guided by hand over the surface.

18. A portable dispensing and distributing device for applying liquid material to a surface comprising a wheeled carrier having tractive engagement with the surface for movement in an unrestricted path thereover, a container for the liquid material on the carrier, a nozzle communicating with the container, extending into proximity to the surface and having an opening constricted to deliver the material in a line upon the surface as it is moved along the same, a pump located between the container and the nozzle opening, means including a wheel of the carrier for operating said pump at a rate proportional to the rate of travel of the device along the work to assure uniform application of fluid thereto, means whereby the carrier may be propelled and guided by hand over the surface, and guiding means adapted to engage the work.

In testimony whereof I affix my signature.

ALFRED J. SIGNOR.